(12) United States Patent
Ma

(10) Patent No.: US 12,038,917 B2
(45) Date of Patent: Jul. 16, 2024

(54) TASK QUERY METHOD AND DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Hao Ma, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 17/771,132

(22) PCT Filed: Oct. 10, 2020

(86) PCT No.: PCT/CN2020/120183
§ 371 (c)(1),
(2) Date: Apr. 22, 2022

(87) PCT Pub. No.: WO2021/088589
PCT Pub. Date: May 14, 2021

(65) Prior Publication Data
US 2022/0300494 A1 Sep. 22, 2022

(30) Foreign Application Priority Data
Nov. 6, 2019 (CN) .......................... 201911076673.4

(51) Int. Cl.
*G06F 16/242* (2019.01)
*G06F 16/215* (2019.01)
*G06F 16/28* (2019.01)

(52) U.S. Cl.
CPC .......... *G06F 16/243* (2019.01); *G06F 16/215* (2019.01); *G06F 16/285* (2019.01)

(58) Field of Classification Search
CPC ..... G06F 16/243; G06F 16/285; G06F 16/215
(Continued)

(56) References Cited

U.S. PATENT DOCUMENTS 8,244,213 B2 * 8/2012 Zhang ............... H04M 3/42153
455/414.1
9,674,121 B2 * 6/2017 Lindner .................. H04L 51/04
(Continued)

FOREIGN PATENT DOCUMENTS

| CN | 105893560 A | 8/2016 |
| CN | 107609058 A | 1/2018 |

(Continued)

OTHER PUBLICATIONS

International Search Report and Written Opinion for Application No. PCT/CN2020//120183 dated Jan. 12, 2021 (11 pages including English translation).

(Continued)

*Primary Examiner* — Cam Linh T Nguyen
(74) *Attorney, Agent, or Firm* — Michael Best & Friedrich LLP

(57) ABSTRACT

The method comprises: acquiring a task query request (S101); determining a first task according to a feature identification code corresponding to an input end of the task query request (S102); when there are a plurality of first tasks, determining, according to a query keyword contained in the task query request, first feature information of the first tasks, and generating a question prompt according to the first feature information (S103); and receiving feedback information inputted by a user according to the question prompt, and determining, according to the feedback information, a
(Continued)

target task corresponding to the task query request from the first tasks (S104). The method can determine a task corresponding to a task query request inputted by a user without the need for a user to use a key template or dictate a task number, thereby improving the user experience.

17 Claims, 4 Drawing Sheets

(58) Field of Classification Search
USPC .......................................................... 707/692
See application file for complete search history.

(56) References Cited

U.S. PATENT DOCUMENTS

| | | | | |
|---|---|---|---|---|
| 11,328,265 | B1* | 5/2022 | Givoly | G06Q 10/1097 |
| 2005/0286711 | A1* | 12/2005 | Lee | H04L 12/5692 |
| | | | | 379/399.01 |
| 2006/0026261 | A1* | 2/2006 | Allday | G06F 9/5055 |
| | | | | 709/217 |
| 2006/0136474 | A1 | 6/2006 | Chang et al. | |
| 2007/0220565 | A1* | 9/2007 | Angel | G06Q 10/087 |
| | | | | 348/E7.071 |
| 2017/0148011 | A1* | 5/2017 | Killoran, Jr. | G06Q 20/3255 |
| 2017/0242886 | A1* | 8/2017 | Jolley | G06F 40/232 |
| 2017/0242899 | A1* | 8/2017 | Jolley | G06F 16/242 |
| 2018/0004732 | A1* | 1/2018 | Brunn | G06F 40/42 |
| 2019/0139074 | A1* | 5/2019 | Tan | G06Q 20/20 |
| 2020/0051677 | A1* | 2/2020 | Harrison | G06F 3/0483 |

FOREIGN PATENT DOCUMENTS

| | | |
|---|---|---|
| CN | 109241252 A | 1/2019 |
| CN | 110019916 A | 7/2019 |

OTHER PUBLICATIONS

Chinese Patent Office First Office Action for Application No. 201911076673.4 dated Jun. 29, 2023 (15 pages, statement of relevance included).

Chinese Patent Office Second Action for Application No. 201911076673.4 dated Apr. 10, 2024 (30 pages with English machine translation).

* cited by examiner

TASK QUERY METHOD AND DEVICE

CROSS-REFERENCE TO RELATED APPLICATION(S)

This is a U.S. national stage entry of International Patent Application No. PCT/CN2020/120183, filed on Oct. 10, 2020, which claims priority to Chinese Patent Application No. 201911076673.4, filed on Nov. 6, 2019, the entire contents of each of which are fully incorporated herein by reference.

TECHNICAL FIELD

The present invention relates to the technical field of computers, and in particular, to a task query method and device.

BACKGROUND ART

In the e-commerce voice unmanned customer service scenario, for a user's query, the user is usually required to provide an order number of the query order. Then, the corresponding order is found out according to the order number to provide a response based on the state of order.

In the prior art, generally by playing the verbal trick guide, causing the user to use a key template to input the corresponding order number or dictate the order number according to the verbal trick guide.

In the process of realizing the present invention, the inventor found that there are at least the following problems in the prior art:

No matter whether to use the key template to input the order number or dictate the order number, the user needs to first remember the order number to be consulted, which increases the difficulty of the user's operation. In addition, once the user inputs the wrong order number by pressing the key or dictates wrongly any number in the order number, the corresponding order is locked incorrectly or fails to lock, which makes the query unable to be continued, thus reducing the query efficiency and resulting in poor user experience.

SUMMARY OF THE INVENTION

In view of this, embodiments of the present invention provide a task query method and device, which can determine a task corresponding to a task query request inputted by a user without the need for a user to use a key template or dictate a task number, thereby improving the query efficiency, and further improving the user experience.

In order to achieve the above object, according to an aspect of the embodiments of the present invention, a task query method is provided, comprising: acquiring a task query request; determining a first task according to a feature identification code corresponding to an input end of the task query request; when there are a plurality of first tasks, determining, according to a query keyword contained in the task query request, first feature information of the first tasks, and generating a question prompt according to the first feature information; and receiving feedback information inputted by a user according to the question prompt, and determining, according to the feedback information, a target task corresponding to the task query request from the first tasks.

Optionally, when the plurality of first tasks are determined according to the feedback information, the following steps are performed cyclically until the target task corresponding to the task query request is uniquely determined according to the feedback information: according to the feedback information, determining the second feature information of the first task, updating the question prompt according to the second feature information, and receiving the feedback information re-inputted by the user according to the updated question prompt.

Optionally, the determining of the first feature information of the first tasks according to the query keywords contained in the task query request comprises: performing word segmentation on the query request to obtain the query keywords; performing semantic analysis on the query keyword to determine the task attribute indicated by the query keyword, and determining the first feature information according to the task attribute.

Optionally, the first feature information includes any one or more of the following: a type of the first task, a generation time of the first task, a task object indicated by the first task, an identification of the task object, a category to which the task object belongs, and a price corresponding to the first task.

Optionally, when the first feature information includes the identification of the task object and the category to which the task object belongs, the generation of a question prompt according to the first feature information comprises: classifying a plurality of the first tasks according to the category to which the task object belongs to obtain the second tasks corresponding to the category to which the task object belongs; for the second tasks corresponding to the same category: extracting question keywords from the task object identification corresponding to the second tasks, de-duplicating the question keywords according to the questions keywords corresponding to the plurality of second tasks, and generating a question prompt according to the de-duplicated question keywords.

Optionally, the generating of a question prompt according to the first feature information comprises: ranking a plurality of the first tasks according to the generation time of the first tasks or the price corresponding to the first tasks, and determining, according to the ranking results, a preset number of third tasks with the latest generation time or the highest price from a plurality of the first orders, and generating a question prompt according to the third tasks.

Optionally, the determining of the first tasks according to the feature identification code corresponding to the input end of the task query request comprises: determining the user's registration information according to the feature identification code, and using the tasks matching the feature identification code or the registration information as the first tasks.

Optionally, when the first task is one, the first task is used as the target task.

Optionally, the determining of the first tasks according to the feature identification code corresponding to the input end of the task query request comprises: determining the first tasks according to the feature identification code corresponding to the input end of the task query request and the query keywords contained in the task query request.

According to a second aspect of the embodiments of the present invention, a task query device is provided, comprising: a request acquisition module, a first task determination module, a question module, and a processing module; wherein the request acquisition module is configured to acquire a task query request; the first task determination module is configured to determine the first tasks according to the feature identification code corresponding to the input end of the task query request; the question module is configured to determine the first feature information of the first task according to the query keywords contained in the task query request when there are a plurality of first tasks, and generate a question prompt according to the first feature information; the processing module is configured to receive feedback information inputted by the user according to the question prompt, and determine, according to the feedback information, a target task corresponding to the task query request from the first tasks.

According to a third aspect of the embodiments of the present invention, a server is provided, comprising: one or more processors; and a storage device for storing one or more programs, when the one or more programs are executed by the one or more processors, the one or more processors implement the method according to any one of the above-mentioned first aspects.

According to a fourth aspect of the embodiments of the present invention, there is provided a computer-readable medium on which a computer program is stored, characterized in that, when the program is executed by a processor, the method according to any one of the above-mentioned first aspects is implemented.

One embodiment of the above invention has the following advantages or beneficial effects: determining the first task according to the feature identification code corresponding to the input end of the task query request, when there are a plurality of first tasks, determining the first feature information of the first tasks according to query keywords contained in the task query request, and then generating a question prompt according to the first feature information, and then determining the target task corresponding to the task query request from the plurality of first tasks according to the feedback information inputted by the user, thereby, when the user consults task information such as orders or complaints and suggestions through unmanned customer service, the task corresponding to the task query request inputted by the user can be determined without the need for the user to use a key template or dictate a task number, thereby improving the query efficiency and user experience.

The further effects of the above non-conventionally used alternatives will be described below in combination with specific mode of carrying out the invention.

DRAWINGS OF THE DESCRIPTION

The drawings are used for better understanding of the present invention and do not constitute an improper limitation on the present invention, wherein.

SPECIFIC MODE OF CARRYING OUT THE INVENTION

Exemplary embodiments of the present invention are illustrated below combining the drawings, which includes various details of the embodiments of the present invention to facilitate understanding and should be considered as exemplary only. Accordingly, those skilled in the art should realize that various changes and amendments can be made to the embodiments described herein without departing the scope and spirit of the invention. Likewise, in order to be clear and concise, descriptions of well-known functions and structures are omitted from the following description.

It should be pointed out that the embodiments of the present invention and the technical features in the embodiments may be combined with each other without conflict.

Figure 1:
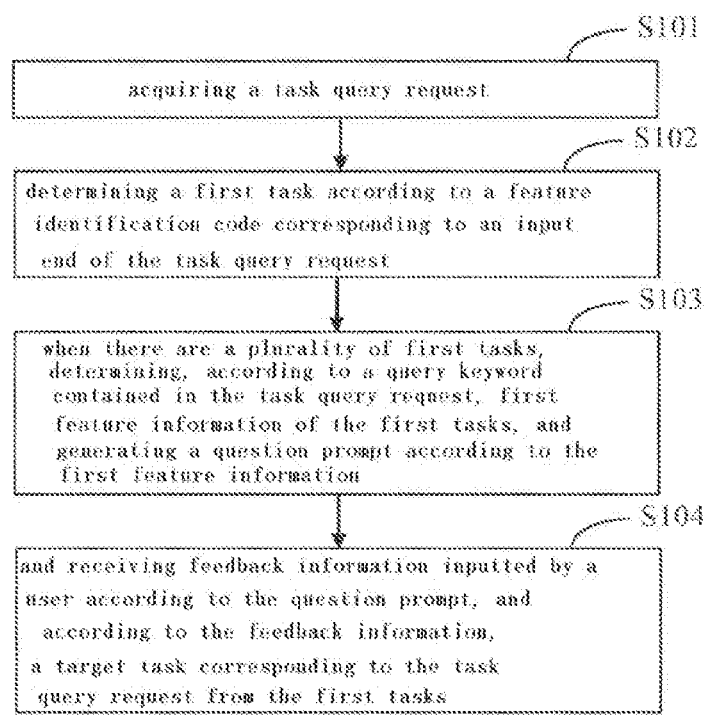
FIG. 1 is a schematic diagram of main steps of a task query method according to embodiments of the present invention.

FIG. 1 is a schematic diagram of main steps of a task query method according to an embodiment of the present invention.

As shown in FIG. 1, a task query method according to an embodiment of the present invention mainly includes the following steps:

Step S101: Acquiring a task query request.

The task query method provided by the embodiments of the present invention can be applied to a voice unmanned customer service scenario or an unmanned customer service scenario based on official accounts or web pages. According to different application scenarios, the form of the task query request is also different. In the voice unmanned customer service scenario, the task query request is a voice query request inputted by the user. In the unmanned customer service scenario based on official accounts or web pages, the task query request can be in text format or voice query request. Although the format of the task query request inputted by the user is different in different application scenarios, the process of determining the task corresponding to the task query request is basically the same. Therefore, to facilitate the description, the following embodiment takes the voice unmanned customer service scenario as an example, that is, the task query request inputted by the user is a voice query request as an example.

It can be understood that the user can consult task information such as orders or complaints and suggestions through unmanned customers, that is, the task query request can be for historical orders or historical complaints and suggestions.

Step S102: Determining the first task according to the feature identification code corresponding to the input end of the task query request.

In the voice unmanned customer service scenario, the user generally consults the task by telephone, and the feature identification code corresponding to the input end of the task query request can be the communication identification code of the mobile phone used by the user for consultations, such as the real mobile phone number corresponding to the dialed mobile phone or the virtual mobile phone number converted according to the preset rules. In an unmanned customer service scenario based on official accounts or web pages, the feature identification code corresponding to the input end of the task query request may be the login information of the user logging into the official accounts or web pages. The task query method provided by the embodiment of the present invention is explained below by taking the feature identification code as an incoming mobile phone number of a task query request inputted by the user as an example.

The task query method provided by the embodiment of the present invention can be realized by a task query device, and the task query device can process historical task information in advance. Taking the user consulting orders as an example, in one embodiment of the present invention, the task query device monitors the order message queue (Message Queue, MQ) to extract the consignee's mobile phone number, account pin and account mobile phone number in the order data, then, these three data are used as a row key (rowkey), the order data is redundantly stored in three copies and stored in HBase. During storage, the order data under the same RowKey is arranged in reverse chronological order.

Based on the statistics of historical query data in the voice unmanned customer service scenario, users have the highest repeated query rate within 72 hours. Therefore, in order to further improve the efficiency of order query, the order data that has been consulted by users within 72 hours are inserted into Hbase as having the same order storage method as the above, that is, the consignee's mobile phone number, account pin and account mobile phone number in the order data are extracted and inserted into Hbase as rowKey, and placed in the frontmost position under the same rowKey.

After receiving the task query request, the user's registration information can be determined according to the feature identification code corresponding to the input end of the task query request, and the task matching the feature identification code or the registration information can be used as the first task.

The user's registration information may be the user's account pin or account mobile phone number. When determining the first task, the user's account pin and account mobile phone number can be consulted according to the feature identification code of the input end (taking the user's incoming mobile phone number as an example). The, the account pin, account mobile phone number and incoming mobile phone number are used as Rowkey, respectively, to search for the top 50 tasks from HBase (this is because the top 50 orders are consulted by the user for more than 90%), when the user consulting the orders, it is determined that the order ranked 50 is searched. When searching, the order data consulted by the user within 72 hours can be preferably searched. If the order data consulted by the user within 72 hours has no order matching the account pin, account mobile phone number or incoming mobile phone number, further searching other order data in HBase.

Then, the search results are combined and deduplicated, and the combined and deduplicated search results can be used as the first task, which is the first task determined by using the feature identification code as the query condition. When the number of the first task is one, the task can be directly used as the target task corresponding to the task query request. If the task cannot be matched with the account pin, account mobile number or incoming mobile phone number, output the fixed verbal trick for asking the mobile phone number, for example: output the fixed verbal trick "Please input the mobile phone number of the orderer or consignee related to the task you want to query", so that the user can input the corresponding mobile phone number according to the fixed verbal trick, and then further match according to the mobile phone number inputted by the user.

In order to further improve the search accuracy, in an embodiment of the present invention, the search results of the above-mentioned search according to the feature identification code can be filtered in combination with the query keywords contained in the task query request, and the filtered results are used as the first task, that is to say, both the feature identification code of the input end and the query keyword can be used as query conditions to determine the first task.

In this embodiment, firstly performing word segmentation on the voice query request inputted by the user using the search word database of the business platform corresponding to the task query device, and obtaining one or more search words, wherein the search word database can search for a collection of words that are highly popular and related to product categories for the business platform. The obtained search words are then associated with the product categories of the business platform, and each search word may be associated with multiple product categories. In order to further refine the product category associated with the search word, the correlation degree between each search word and its associated product category can be calculated according to the following formula (1).

$$K=(m/n)\times(1+\log n) \quad (1)$$

Among them, K represents the correlation degree between the search word and its associated product category, m represents the number of times users click on the corresponding category after searching for the above search word, and n represents the popularity of the search word.

After calculating the correlation degree, the product categories with the correlation degree greater than the preset threshold can be regarded as the product category associated with the search word, and each product category has its corresponding category id, so that the search word and the corresponding category id can be obtained. When the task query request inputted by the user is received, the search word and category id corresponding to the task query request can be determined, and then consult the keyword according to the search word, and the category id corresponding to the search word is further determined, and then determine the first task according to the search word and/or category id. For example, when the task query request inputted by the user is "Where is the rice noodle I bought?", the returned search word and category id can be as follows:

```
{
  "cid": "1533",
  "search": "rice noodle"
}
```

The task data set obtained by combining the above search results obtained according to the account pin, account mobile phone number or incoming mobile phone number and deduplicating is used as U1, and then U1 is further filtered using the search word and category id. Taking the above category id 1533 and the search word of rice noodles as an example, U1 can be filtered by category id firstly, that is, the subset U2 corresponding to category id1533 is taken from U1. The task data in U2 corresponds to category id1533, and then the subset U3 corresponding to the rice noodle is taken from U2, the task data in U3 all correspond to the search word rice noodle. Thus, the first task is determined according to the feature identification code and the query keyword, and the determined first task is the task data in U3.

Certainly, when the search word in the task query request does not have a corresponding category id, the step of filtering U1 by category id can also be omitted, and the search word is directly used to filter U1, or, after filtering U1 using the search word, if the filtering result is an empty set, the task data in U1 is directly used as the first task.

It can be understood that the above-mentioned embodiment is the process of determining the first task by using both the feature identification code of the input end and the query keyword as query conditions. In the practical application, the first task can also be determined using only the feature identification code of the input end as the query condition according to actual situation.

Step S103: when there are a plurality of first tasks, determine the first feature information of the first task according to the query keywords included in the task query request, and generate a question prompt according to the first feature information.

When it is determined that the first task is one, said first task is directly regarded as the target task corresponding to the task query request without generating the question prompt.

When there are a plurality of first tasks, determine the first feature information of the first task according to the query keyword, and generate a question prompt according to the first feature information. The first feature information includes any one or more of the following: the type of the first task, the generation time of the first task, the task object indicated by the first task, the identification of the task object, the category to which the task object belongs, and the price corresponding to the first task.

Specifically, the word segmentation of the task query request can be performed to obtain the query keyword, and then the semantic analysis of the query keyword can be performed to determine the task attribute indicated by the query keyword, and the first feature information can be determined according to the task attribute.

The type of the first task may be an order task or a complaint task. When the first task is an order task, the task object indicated by the first task is the item included in the first task, correspondingly, the identification of the task object is the item identification, the category to which the task object belongs is the item category of the item, and the price corresponding to the first task is the item price corresponding to the item. When the first task is a complaint task, the task object indicated by the first task is an item or a service person included in the first task, and accordingly, the identification of the task object is item identification or identification of the service person, such as a badge number of the service person, the category to which the task object belongs is the item category or the department to which the service person belongs, and the price corresponding to the first task is the item price or the price corresponding to the complaint task.

Taking the first task being the order type as an example, the task query request inputted by the user is "please check the logistics status of my order yesterday", the task query request is word-segmented, and the word segmentation results can be obtained as "please", "check", "my", "yesterday", "of" "order", "of", "logistics status". Here, all the segmented words in the word segmentation results can be used as query keywords, or the segmented words in the word segmentation results can be firstly subjected to semantic analysis or speech analysis, so as to use the segmented words with query meaning as query keywords. In this example, obviously "please", "check", "my", and "of" are all auxiliary words or nouns without query meaning, so other words than these words in the word segmentation results are used as query keywords, that is, to use "yesterday", "order" and "logistics status" as query keywords.

Further, the semantic analysis of the query keywords is performed to determine that the task attribute indicated by "yesterday" is time attribute. Thus, determine the first feature information to be the generation time of the first task according to the task attribute, and then generate a question prompt according to the generation time of the first task. For example, it is determined that the generation times of the two first tasks corresponding to the user are 10:00 am and 2:00 pm, respectively, and the generated question prompt is "Are you looking for a task at 10:00 am or a task at 2:00 pm".

In addition, the semantic analysis of "order" is performed to determine that the task attribute indicated by "order" is the task type. Therefore, according to the task type, the first feature information is determined as the type of the first task (order corresponds to the order type), and then the question prompt is generated according to the type of the first feature information. For example, it is determined that the task types of the two first tasks corresponding to the user are the order type and the complaint type, respectively, and the generated question prompt is "Are you looking for an order task or a complaint task".

For another example, according to the "logistics status", it is determined that the indicated task attribute is the state attribute of the task, so the first feature information is determined to be the state of the first task according to the task attribute, and then the question prompt is generated according to the state of the first task. For example, it is determined that the status of the two first tasks corresponding to the user are in delivery and delivered, respectively, and the generated question prompt is "Are you looking for the order in delivery or delivered".

In addition, when the keyword included in the task query request is a search word, determine the item category corresponding to the first task according to the search word, and generate a question prompt. For example, when the task query request is "When will the tableware I bought be delivered", the item categories to which the items in the two first tasks belong can be determined according to the search word "tableware" as "spoon" and "chopsticks" respectively, then the generated question prompt is "May I ask whether the task you are looking for contains spoons or chopsticks".

It can be understood that, when the first task is a complaint task, the process of determining the first feature information and generating a question prompt according to the first feature information is similar to that when the first task is an order task, which will not be repeated here.

When there are a plurality of tasks corresponding to the same category, it is difficult to simply use the category to generate a question prompt. In this case, you can first classify the plurality of first tasks according to the category to which the task object belongs to obtain the second task corresponding to the category to which the task object belongs. For the second task corresponding to the same category: extracting question keywords from the task object identification corresponding to the second task, de-duplicating the question keywords according to the question keywords corresponding to the plurality of second tasks, and generating a question prompt according to the deduplicated question keywords.

Still taking the first task being an order task as an example, there are three first tasks determined according to the feature identification code and the query keyword, wherein the item categories of the items included in the first task A are category A and category B, respectively. The item categories of the items included in the first task B are category A and category C, respectively, and the item categories of the items included in the first task C are category A and category D, respectively, classifying the first tasks according to the item categories. The number of the second tasks corresponding to category A is three. The number of the second tasks corresponding to category B, category C, and category D, respectively, is one. Then, a question prompt can be generated directly according to category B, category C, and category D.

In the practical application process, the same item category generally corresponds to the plurality of second tasks, then the question keywords can be extracted from the item identification according to the item identification corresponding to the plurality of second tasks, and the question keywords are deduplicated, and then a question prompt is generated according to the item identification after deduplication. For example, when the task query request is "Where are the clothes I bought?", it is determined that there are three second tasks corresponding to the item category of "clothes". Specifically, it is determined that the item identification of the second task A is "Mumianlin Large size women's clothing 2019 new summer clothing 100 kg women's top simple hollow round neck pure cotton elastic embroidered mid-length T-shirt L191577 yellow", and it is determined that the item identification of the second task B is "Brand A 2019 large size women's spring clothing new Korean version casual round neck sequin embroidery split short-sleeved T-shirt 0302 black 3XL", and it is determined that the item identification of the second task C is "Brand B plus size women's fat mm short-sleeved T-shirt women's 2019 summer new fat sister summer clothing Korean version bottoming shirt plus fat and plus size top clothing 100 kg wine red L". Then, the question keywords are extracted from the item identification. Taking the extraction of question keywords from the item identification of the second task A as an example to describe the extraction of question keywords in detail below:

First, based on the search word database, the above item identification is segmented using the word segmentation tool, and the results are as follows: Mumianlin/plus/large size women's clothing/2019/new style/summer clothing/100/kg/women's top/simple/hollow/round neck/pure cotton/elastic/embroidery/mid-length/T-shirt/1191577/yellow, where search words include: "Mumianlin", "plus size women's clothing", "summer clothing", "women's tops", "pure cotton", "Embroidery", "mid-length", "T-shirt".

Then, according to the popularity of the search words, these search words are ranked, for example, the ranking results are: 22232—large size women's clothing, 3597—T-shirt, 332—summer clothing, 318—embroidery, 269—pure cotton, 201—Mumianlin, 196—Women's tops, the number in front of each search word represents the popularity of the search word.

Then, the context terms of the ranked search words and segmentation words are combined using N-Gram to obtain question keywords. The combining rules are as follows: only keeping keywords whose combined word length is greater than or equal to 3 and less than or equal to 6; performing N-Gram calculation only for letters and term of Chinese characters, and stopping the calculation when the word length is greater than 6 and terms of non-letter and non-Chinese character are encountered; traversing all search words to obtain alternative keywords.

In addition, in order to filter the noise, the word segmentation results of the last 20% of the item names are deleted before the calculation, because the rear part of the item name is mostly color, size, etc., and the discrimination is not high. For example, the information following the item name is filtered: Mumianlin/plus/plus size women's clothing/2019/new style/summer clothing/100/kg/women's tops/simple/hollowed out/round neck/pure cotton/elastic/embroidery/mid-length/T-shirt.

The question keywords after the combination of N-Gram are plus size women's clothing, mid-length T-shirts, new summer clothing; elastic embroidery, embroidered mid-length, round neck pure cotton, pure cotton elastic, Mumianlin plus, kg women's tops, women's tops simple.

Using the same method, the question keywords can be extracted from the item identification in the second task B and the second task C. The question keywords corresponding to the second task A, the second task B and the second task C can be shown in Table 1 below:

TABLE 1

| Second task | Item identification | Question keywords |
|---|---|---|
| A | Mumianlin plus large size women's clothing 2019 new style summer clothing 100/kg women's top simple hollow round neck pure cotton elastic embroidered mid-length T-shirt 1191577 yellow | plus size women's clothing; mid-length T-shirt; new style summer clothing; elastic embroidery; embroidered mid-length; round neck pure cotton; pure cotton elastic; Mumianlin plus; kg women's tops; women's tops simple; |
| B | Brand A 2019 large size women's spring clothing new Korean version casual round neck sequin embroidery split short-sleeved T-shirt 0302 black 3XL | Slimming short-sleeved T-shirts; Brand A; sequin embroidery; embroidery split; women's spring clothing new style; Korean version casual; casual round neck; |
| C | Brand B plus size women's fat mm short-sleeved T-shirt women's 2019 summer new fat sister summer clothing Korean version bottoming shirt plus fat and plus size top clothing 100 kg wine red L | Large size women's fat; short-sleeved T-shirts; Korean version bottoming shirt; bottoming shirt plus fat; fat sister summer clothing; large size women's tops; |

Then the question keywords corresponding to each of the second tasks are deduplicated. Specifically, calculating similarity between each question keyword in each second task and the question keywords of other second tasks using tf-idf similarity model, and the question keywords whose similarity is greater than a threshold is deleted. For example, when the similarity of the question keyword "plus size women's clothing" in the second task A to the question keyword "large size women's clothing fat" in the second task C is greater than the threshold, both "plus-size women's clothing" in the second task and "plus-size women's clothing fat" in the second task C are deleted. The question keywords of each second task after deduplication are shown in Table 2 below:

TABLE 2

| Second task | Question keywords after deduplication |
|---|---|
| A | embroidered mid-length; pure cotton elastic; Mumianlin plus; kg women's tops; women's tops simple |
| B | Brand A; Korean version casual; casual round neck |
| C | Korean version bottoming shirt; bottoming shirt plus fat; fat sister summer clothing |

Then, according to the ranking order of the question keywords after deduplication, combining the search words in the task query request to generate a question prompt. In this example, the search word is "clothes", and the first ranked question keywords in each second task are "embroidered mid-length clothes", "brand A" and "Korean style bottoming shirt", then the generated question prompt is "Would you like to consult the embroidered mid-length clothes, the clothing of brand A is still Korean style bottoming shirts. If there is no specified search word in the task query request, a question prompt can be generated according to the deduplicated question keyword and the item category corresponding to each second task. For example, when the task query request does not include the search word "clothing", the item category corresponding to the second task is "Large size women's clothing", the generated question prompt is "May I ask whether you are looking for the embroidered medium and long plus size women's clothing, brand A large size women's clothing is still the Korean-style bottoming shirt large size women's clothing". Therefore, by de-duplicating question keywords, the information contained in the generated question prompts can be made to uniquely correspond to the second task as much as possible, thereby reducing the number of times of outputting question prompts to users, that is, reducing the number of times of inputting feedback information by the user, thereby reducing the user's operation and further improving user experience.

In order to shorten the generation efficiency of question prompts and improve the efficiency of task query, when generating question prompts, the plurality of first tasks are ranked directly based on the generation time of the first task or the price corresponding to the first task. According to the ranking results, determine the preset number of third tasks with the latest generation time or the highest price from the plurality of first orders, and generate the question prompt according to the third task.

For example, generate the question prompt directly according to the first tasks ranked in the top 3, because the probability of the user querying the second tasks ranked in the top 3 is greater than 80%, or generate the question prompt according to the item prices of the items in the first task, for example, generate question prompts directly based on the item with the highest price in the second task.

Step S104; Receive feedback information inputted by the user according to the question prompt, and determine a target task corresponding to the task query request from the first task according to the feedback information.

In the specific implementation process, when the number of first tasks is more and a plurality of first tasks correspond to the same feature information, it may not be possible to determine the target task corresponding to the task query request according to one question prompt. At this time, a question prompt needs to be further generated according to the users feedback information until the number of questions exceeds the preset number of times threshold or the target task corresponding to the task query request is found. That is to say, in the task query method provided by the embodiment of the present invention, when a plurality of first tasks are determined according to the feedback information, the following steps are performed cyclically until the target task corresponding to the task query request is uniquely determined according to the feedback information: determining the second feature information of the first task according to the feedback information, updating the question prompt according to the second feature information, and receiving feedback information re-inputted by the user according to the updated question prompt.

For example, when the search word included in the task query request is "skirt", it is determined that five first tasks correspond to "skirt", wherein two of the first tasks have the item category "skirt", and three of the first tasks have the item category "dress", then the firstly generated question prompt is "Would you like to inquiry about a skirt or a dress?", when the user's feedback information received is "dress", further determining the second feature information of the first task of which three item categories are "dress" according to the feedback information of the user to update the question prompt. For example, update the question prompt "Would you like to inquiry about the yellow dress, red dress or green dress", when the user's feedback information received is "red dress", the first task corresponding to "red dress" is taken as the target task corresponding to the task query request.

Figure 2:
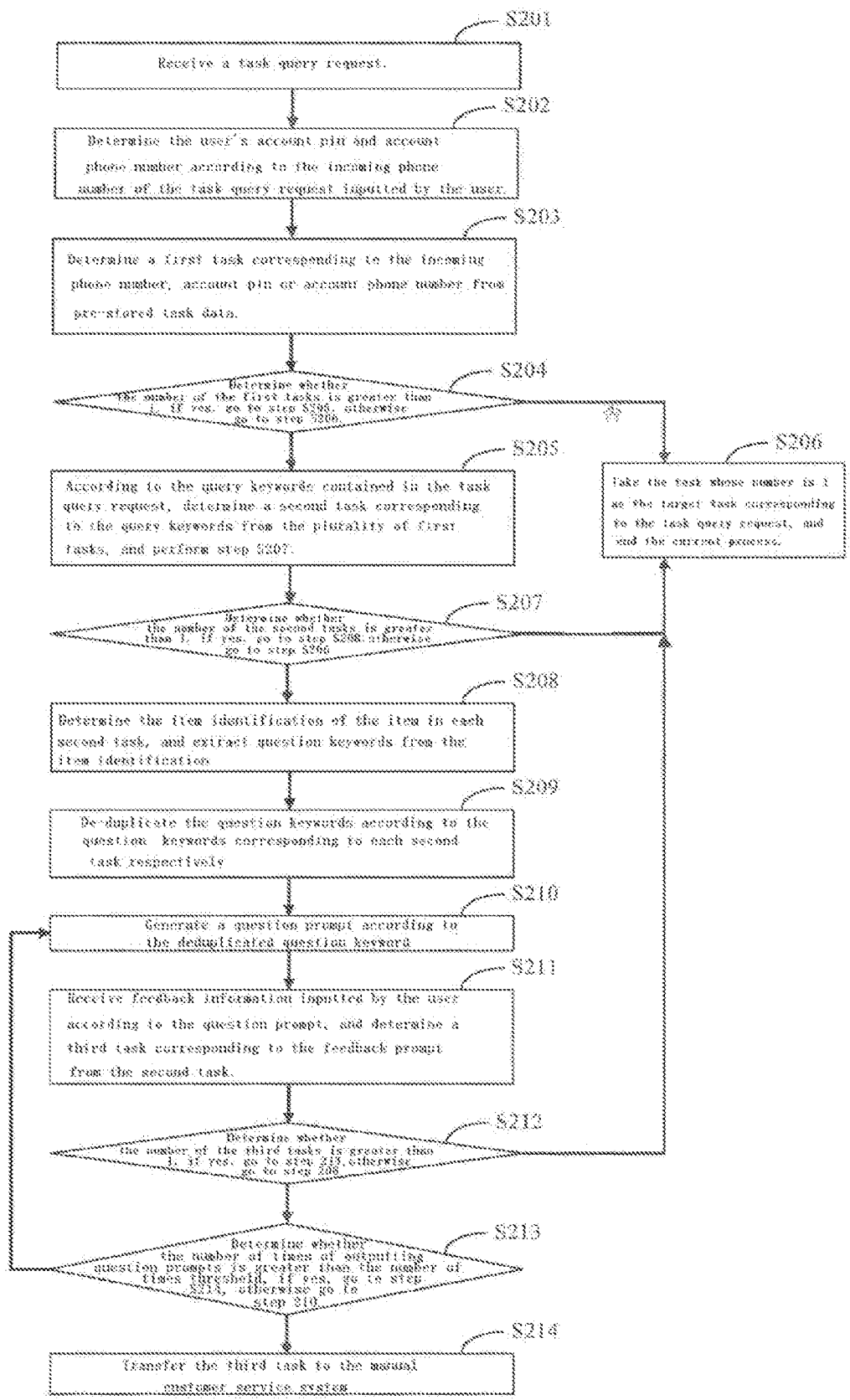
FIG. 2 is a schematic diagram of main steps of another task query method according to embodiments of the present invention.

Hereinafter, the task query method provided by the embodiments of the present invention is described in detail below by taking the user's voice input of task query information to consult the order task, and taking the user's incoming phone number as the feature identification code of the input end of the task query request as an example, as shown in FIG. 2, the task query method may include the following steps:

Step S201: Receive a task query request.

Step S202: Determine the user's account pin and account phone number according to the incoming phone number of the task query request inputted by the user.

Step S203: Determine a first task corresponding to the incoming phone number, account pin or account phone number from pre-stored task data.

Step S204: Determine whether the number of the first tasks is greater than 1, if yes, go to step S205, otherwise go to step S206.

Step S205: According to the query keywords contained in the task query request, determine a second task corresponding to the query keywords from the plurality of first tasks, and perform step S207.

The query keywords contained in the task query request may be search words, category words corresponding to item categories, or words with time attributes.

Step S206: Take the task whose number is 1 as the target task corresponding to the task query request, and end the current process.

It is understandable that when the first task is not found, that is, when the number of the first task is 0, the fixed verbal trick of asking the mobile phone number can be outputted, for example, output: "Please input the mobile phone number of the orderer or the person who is related to the task you want to consult".

Step S207: Determine whether the number of the second tasks is greater than 1, if yes, go to step S208, otherwise go to step S206.

It can be understood that when the number of the second tasks is 0, that is, when there is no second task corresponding to the query keyword in the first task, all first tasks can be directly used as second tasks, and the subsequent process is continued, or output the fixed verbal trick of asking the mobile phone number.

Step S208: Determine the item identification of the item in each second task, and extract question keywords from the item identification.

For example, the item identification is the item name of the items in each second task.

Step S209: De-duplicate the question keywords according to the question keywords corresponding to each second task respectively.

Step S210: Generate a question prompt according to the deduplicated question keyword.

Step S211: Receive feedback information inputted by the user according to the question prompt, and determine a third task corresponding to the feedback prompt from the second task.

Step S212: Determine whether the number of the third tasks is greater than 1, if yes, go to step 213, otherwise go to step 206.

Step S213: Determine whether the number of times of outputting question prompts is greater than the number of times threshold, if yes, go to step S214, otherwise go to step 210.

It can be understood that when the question prompt is generated again according to the question keyword, the question prompt is generated according to the unselected question keyword corresponding to each third task. For example, the question keywords corresponding to the third task A are A1 and A2, the question key words corresponding to the third task B are B1 and B2. The firstly generated question prompt has already selected A1 and B1, then when the question prompt is generated again, it is necessary to combine the unselected A2 and B2 to generate the question prompt.

Step S214: Transfer the third task to the manual customer service system.

According to the above task query method, the task corresponding to the task query request inputted by the user can be determined without the need for the user to use a key template or dictate the task number, thereby improving user experience. When the above task query method is applied to the voice unmanned customer service scenario, the information inputted and obtained by the user can be shown in Table 3. It can be seen that the user only needs to input the task query request by voice, and the unmanned customer service system can, adopting the task query device provided by the embodiment of the invention, quickly determine the task corresponding to the task query request based on the query condition of the user. The use of the task query method provided by the embodiment of the invention shortens at least 20S of the user consultation time compared with manual labeling, and costs the time for the user to input the task number, and thereby improving the user experience.

TABLE 3

| User | unmanned customer service |
| --- | --- |
| Where are the jeans I bought? skinny jeans | Do you want to consult the Japanese and Korean ripped jeans or skinny jeans? The skinny jeans you consulted, the task number XXX has been out of stock and will be delivered to you soon, please be patient. |

Figure 3:
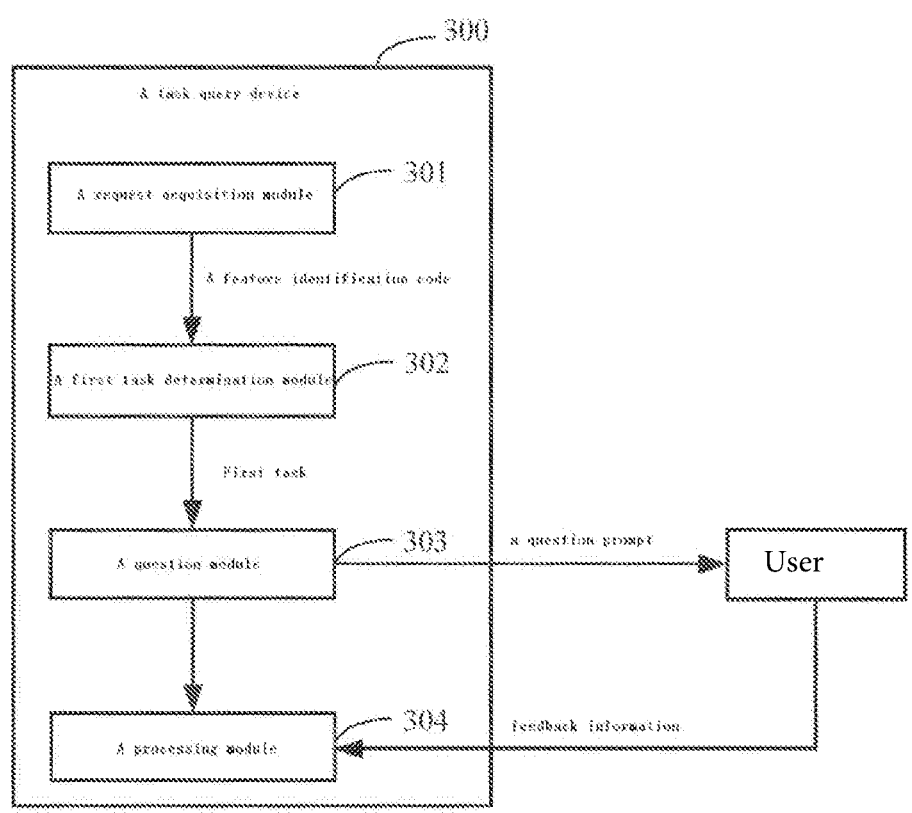
FIG. 3 is a schematic diagram of main modules of a task query device according to embodiments of the present invention.

As shown in FIG. 3, the embodiment of the present invention further provides a task query device 300, including: a request acquisition module 301, a first task determination module 302, a question module 303, and a processing module 304; wherein, the request acquisition module 301 is configured to obtain the task query request; the first task determination module 302 is configured to determine the first task according to the feature identification code corresponding to the input end of the task query request; the question module 303 is configured to determine the first feature information of the first task according to the query keywords contained in the task query quest when there are a plurality of first tasks, and generate the question prompt according to the first feature information; the processing module 304 is configured to receive the feedback information inputted by the user according to the question prompt and determine a target task corresponding to the task query request from the first task according to the feedback information.

In an embodiment of the present invention, the question module 303 is configured to perform the following steps cyclically when a plurality of first tasks are determined according to the feedback information, until the target task corresponding to the task query quest is determined uniquely according to the feedback information:

According to the feedback information, determine the second feature information of the first task, update the question prompt according to the second feature information, and receive the feedback information re-inputted by the user according to the updated question prompt.

In an embodiment of the present invention, the question module 303 is configured to perform word segmentation on the task query request to obtain the query keyword; perform semantic analysis on the query keyword to determine the task attribute indicated by the query keyword, and determine the first feature information according to the task attribute.

In an embodiment of the present invention, the first feature information includes any one or more of the following: the type of the first task, the generation time of the first task, the task object indicated by the first task, the identification of the task object, the category to which the task object belongs, and the price corresponding to the first task.

In an embodiment of the present invention, the question module 303 is configured to classify the plurality of first tasks according to the category to which the task object belongs, and obtain the second task corresponding to the category to which the task object belongs; for the second task corresponding to the same category: extracting the question keywords from the task object identification corresponding to the second task, de-duplicating the question keywords according to the question keywords corresponding to the plurality of second tasks respectively, and generating a question prompt according to the question keyword after deduplication.

In an embodiment of the present invention, the question module 303 is configured to rank a plurality of the first tasks according to the generation time of the first task or the price corresponding to the first task, and according to the ranking result, determine the preset number of third tasks with the latest generation time or the highest price among the plurality of first orders, and generate a question prompt according to the third tasks.

In an embodiment of the present invention, the first task determination module 302 is configured to determine the registration information of the user according to the feature identification code, and use the task matching the feature identification code or the registration information as the first task.

In an embodiment of the present invention, when the first task is one, the first task is used as the target task.

In an embodiment of the present invention, the first task determination module 302 is configured to determine the first task according to a feature identification code corresponding to an input end of the task query request and a query keyword contained in the task query request.

An embodiment of the present invention further provides a server, including; one or more processors: and a storage device for storing one or more programs, when the one or more programs are executed by the one or more processors, causing the one or more processors to implement the method as described in any one of the above embodiments.

An embodiment of the present invention further provides a computer-readable medium on which a computer program is stored, characterized in that, when the program is executed by a processor, the method described in any one of the above embodiments is implemented.

Figure 4:
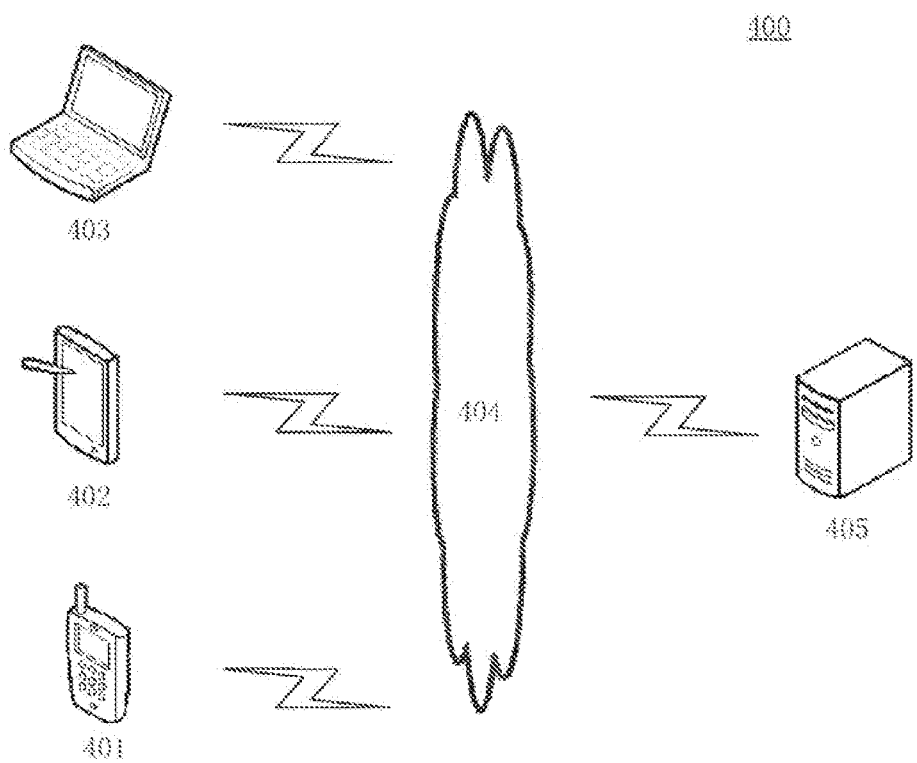
FIG. 4 is an exemplary system architecture diagram to which embodiments of the present invention may be applied.

FIG. 4 shows an exemplary system architecture 400 to which the task query method or the ask query device according to embodiments of the present invention can be applied.

As shown in FIG. 4, the system architecture 400 may include terminal devices 401, 402, and 403, a network 404 and a server 405. The network 404 is used to provide a medium of a communication link between the terminal devices 401, 402, and 403 and the server 405. The network 404 may include various connection types, such as wired, wireless communication links, or fiber-optic cables, etc.

The user can use the terminal devices 401, 402, 403 to interact with the server 405 through the network 404 to receive or send messages and the like. Various communication client applications may be installed on the terminal devices 401, 402, and 403, such as shopping applications, web browser applications, search applications, instant messaging tools, email clients, social platform software, and the like.

The terminal devices 401, 402, 403 may be various electronic devices having a display screen and supporting web browsing, including but not limited to smart phones, tablet computers, laptop computers, desktop computers, and the like.

The server 405 may be a server that provides various services, for example, a background management server that provides support for shopping websites browsed by the user using terminal devices 401, 402 and 403. The background management server can analyze and process the received product information query request and other data, and feed back the processing results (e.g., target push information, product information) to the terminal device.

It should be noted that the task query method provided in the embodiment of the present invention is generally executed by the server 405, and accordingly, the task query device is generally disposed in the server 405.

It should be understood that the numbers of terminal devices, networks and servers in FIG. 4 are merely illustrative. According to needs for implementation, there can be any number of terminal devices, networks and servers.

Hereinafter referring to FIG. 5, it shows a schematic structural diagram of a computer system 500 suitable for implementing a terminal device according to an embodiment of the present invention. The terminal device shown in FIG. 5 is only an example, and should not bring any limitations to functions and scope of use of the embodiments of the present invention.

Figure 5:
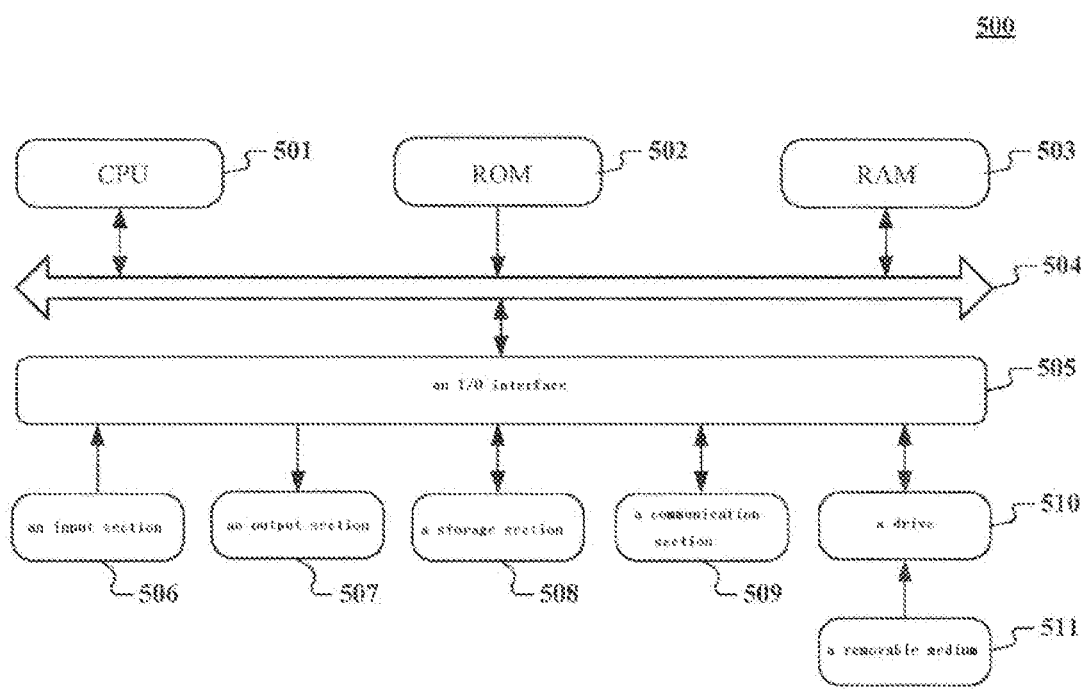
FIG. 5 is a schematic diagram of structure of a computer system suitable for implementing a terminal device or a server according to embodiments of the present invention.

As shown in FIG. 5, the computer system 500 includes a central processing unit (CPU) 501 which can execute various appropriate actions and processes according to a program stored in a read only memory (ROM) 502 or a program loaded into a random access memory (RAM) 503 from a storage section 508. Various programs and data required for the operation of the system 500 are also stored in the RAM 503. CPU 501, ROM 502, and RAM 503 are connected to each other through a bus 504. An input/output (I/O) interface 505 is also connected to bus 504.

The following members are connected to the I/O interface 505, comprising: an input section 506 including a keyboard, a mouse, etc.; an output section 507 including a cathode ray tube (CRT), a liquid crystal display (LCD), and a speaker, etc.; a storage section 508 including a hard disk, etc.; and a communication section 509 including a network interface card such as a LAN card, a modem, and the like. The communication section 509 executes communication processing via a network such as the Internet. A drive 510 is also connected to the I/O interface 505 according to needs. A removable medium 511, such as a magnetic disk, an optical disk, a magneto-optical disk, a semiconductor memory, etc., is mounted on the drive 510 according to needs so that a computer program read therefrom is mounted in the storage section 508 according to needs.

In particular, according to embodiments disclosed in the present invention, the processes described above with reference to the flowcharts may be implemented as computer software programs. For example, embodiments disclosed herein include a computer program product comprising a computer program carried on a computer-readable medium, the computer program containing a program code for performing the method illustrated in the flowchart. In such an embodiment, the computer program may be downloaded and installed from the network via the communication section 509 and/or installed from the removable medium 511. When the computer program is executed by the central processing unit (CPU) 501, the above-described functions defined in the system of the present invention are executed.

It should be noted that the computer-readable medium shown in the present invention may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage media may include, but are not limited to, electrical connections having one or more wires, portable computer disks, hard disks, random access memory (RAM), read only memory (ROM), erasable programmable read only memory (EPROM or flash memory), fiber optics, portable compact disk read only memory (CD-ROM), optical storage devices, magnetic storage devices, or any suitable combination of the above. In the present invention, a computer-readable storage medium may be any tangible medium that contains or stores a program which can be used by or in connection with an instruction execution system, apparatus, or device. In the present invention, however, a computer-readable signal medium may include a data signal propagated in baseband or as part of a carrier wave, carrying computer-readable program code. Such propagated data signals may take a variety of forms including, but not limited to, electromagnetic signals, optical signals, or any suitable combination of the above. A computer-readable signal medium can also be any computer-readable medium other than a computer-readable storage medium that can transmit, propagate, or transport the program for use by or in connection with the instruction execution system, apparatus, or device. The program code contained on the computer readable medium may be transmitted using any suitable medium including, but not limited to, wireless, wire, optical cable, RF, etc., or any suitable combination of the above.

The flowchart and block diagrams in the figures illustrate the system architecture, functionality, and operation that can possibly be implemented in accordance with the systems, methods and computer program products of various embodiments of the present invention. In this regard, each block in the flowchart or block diagrams may represent a module, a program segment, or a portion of code that contains one or more executable instructions for implementing the specified logical function(s). It should also be noted that, in some alternative implementations, the functions noted in the blocks may occur in an order different from the order noted in the figures. For example, two blocks shown in succession may, in fact, be executed substantially concurrently, or they may sometimes be executed in a reverse order, depending upon the involved functionality. It is also noted that each block of the block diagrams or flowchart, and combinations of blocks in the block diagrams or flowchart, can be implemented by the dedicated hardware-based systems that perform the specified functions or operations, or can be implemented using a combination of dedicated hardware and computer instructions.

The modules involved in the embodiments of the present invention may be implemented in a software manner, and may also be implemented in a hardware manner. The described modules can also be set in the processor, for example, it can be described as: a processor including an acquisition module, a first task determination module, a question module and a processing module. Wherein, the names of these modules do not constitute a limitation on the module itself under certain circumstances, for example, the request acquisition module may also be described as "acquire a task query request module".

As another aspect, the present invention also provides a computer-readable medium, which may be included in the device described in the above embodiments: or may exist alone without being assembled into the device. The above-mentioned computer-readable medium carries one or more programs, and when the above-mentioned one or more programs are executed by one of said device, the device includes: acquiring a task query request; determining a first task according to the query condition indicated by said task query request; when there are a plurality of first tasks, generating a question prompt; receiving the feedback information inputted by the user according to the question prompt, and determining the second task corresponding to the task query request from the first task according to the feedback information.

In accordance with the technical solution of the embodiment of the present invention, determining the first task according to the feature identification code corresponding to the input end of the task query request, and when there are a plurality of first tasks, determining the first feature information of the first task according to the query keywords contained in the task query request, and then generating a question prompt according to the first feature information, and then determining the target task corresponding to the task query request from the plurality of first tasks according to the feedback information inputted by the user, thereby, when the user consults the order or giving complaints or suggestions through the unmanned customer service, the task corresponding to the task query request inputted by the user can be determined without the need of the user to use a key template or dictate the task number, thereby improving the consultation efficiency and thus the user experience.

The above-mentioned specific embodiments do not constitute a limitation on the scope of protection of the present invention. Those skilled in the art should know that various modifications, combinations, sub-combinations and substitutions may occur depending on design requirements and other factors. Any modifications, equivalent replacements and improvements made within the spirit and principle of the present invention shall be included within the scope of protection of the present invention.

The invention claimed is:

1. A task query method, comprising:
acquiring a task query request;
determining a first task according to a feature identification code corresponding to an input end of the task query request;
when there are a plurality of first tasks, determining first feature information of the first tasks according to a query keyword contained in the task query request, and generating a question prompt according to the first feature information;
receiving feedback information inputted by a user according to the question prompt, and determining, according to the feedback information, a target task corresponding to the task query request from the first task,
wherein, in a voice unmanned customer service scenario, the feature identification code is a communication identification code of a mobile phone used by the user for consultation, and in an unmanned customer service scenario based on official accounts or web pages, the feature identification code is a login information of the user logging into an official accounts or web pages, and
wherein the determining of the first task according to the feature identification code corresponding to the input end of the task query request comprises:
determining, according to the feature identification code, the user's registration information, and using the task matching the registration information as the first task.

2. The method according to claim 1, wherein,
when a plurality of first tasks are determined according to the feedback information, following steps are performed cyclically until a target task corresponding to the task query request is determined uniquely according to the feedback information, the steps being that:
according to the feedback information, second feature information of the first task is determined,
the question prompt is updated according to the second feature information, and
feedback information re-inputted by the user according to the updated question prompt is received.

3. The method according to claim 1, wherein the determining of first feature information of the first tasks according to a query keyword contained in the task query request comprises:
performing word segmentation on the task query request to obtain the query keyword;
performing semantic analysis on the query keyword, determining a task attribute indicated by the query keyword, and determining the first feature information according to the task attribute.

4. The method according to claim 1, wherein,
the first feature information includes any one or more of the following:
a type of the first task, a generation time of the first task, a task object indicated by the first task, an identification of the first task object, a category to which the task object belongs, and a price corresponding to the first task.

5. The method according to claim 4, wherein, when the first feature information includes an identification of the task object and a category to which the task object belongs, the generating of a question prompt according to the first feature information comprises:
classifying a plurality of the first tasks according to the category to which the task object belongs to obtain a second task corresponding to the category to which the task object belongs;
for the second tasks corresponding to the same category: extracting question keywords from the task object identification corresponding to the second task, and de-duplicating the question keywords according to the question keywords corresponding to a plurality of the second tasks respectively, and generating a question prompt according to the question keyword after deduplication.

6. The method according to claim 4, wherein the generating of a question prompt according to the first feature information comprises:

ranking a plurality of the first tasks according to the generation time of the first task or the price corresponding to the first task, and determining, according to the ranked results, a preset number of third tasks with the latest generation time or the highest price from a plurality of the first orders, and generating a question prompt according to the third task.

7. The method according to claim 1, wherein the determining of the first task according to the feature identification code corresponding to the input end of the task query request comprises:
determining the first task according to the feature identification code corresponding to the input end of the task query request and the query keyword contained in the task query request.

8. The method according to claim 1, wherein,
when the first task is one, the first task is used as the target task.

9. A server, comprising:
one or more processors;
a non-transitory storage device for storing one or more programs, when the one or more programs are executed by the one or more processors, the one or more processors are enabled to implement the method according to claim 1.

10. A non-transitory computer-readable medium having a computer program stored thereon, when executed by a processor of the computer, the program causes the processor to implement:
acquiring a task query request;
determining a first task according to a feature identification code corresponding to an input end of the task query request;
when there are a plurality of first tasks, determining first feature information of the first tasks according to a query keyword contained in the task query request, and generating a question prompt according to the first feature information;
receiving feedback information inputted by a user according to the question prompt, and determining, according to the feedback information, a target task corresponding to the task query request from the first task,
wherein, in a voice unmanned customer service scenario, the feature identification code is a communication identification code of a mobile phone used by the user for consultation, and in an unmanned customer service scenario based on official accounts or web pages, the feature identification code is a login information of the user logging into an official accounts or web pages, and
wherein the determining of the first task according to the feature identification code corresponding to the input end of the task query request comprises:
determining, according to the feature identification code, the user's registration information, and using the task matching the registration information as the first task.

11. The non-transitory computer-readable medium according to claim 10, wherein,
when a plurality of first tasks are determined according to the feedback information, following steps are performed cyclically until a target task corresponding to the task query request is determined uniquely according to the feedback information, the steps being that:
according to the feedback information, second feature information of the first task is determined,
the question prompt is updated according to the second feature information, and
feedback information re-inputted by the user according to the updated question prompt is received.

12. The non-transitory computer-readable medium according to claim 10, wherein the determining of first feature information of the first tasks according to a query keyword contained in the task query request comprises:
performing word segmentation on the task query request to obtain the query keyword;
performing semantic analysis on the query keyword, determining a task attribute indicated by the query keyword, and determining the first feature information according to the task attribute.

13. The non-transitory computer-readable medium according to claim 10, wherein,
the first feature information includes any one or more of the following:
a type of the first task, a generation time of the first task, a task object indicated by the first task, an identification of the first task object, a category to which the task object belongs, and a price corresponding to the first task.

14. The non-transitory computer-readable medium according to claim 13, wherein, when the first feature information includes an identification of the task object and a category to which the task object belongs, the generating of a question prompt according to the first feature information comprises:
classifying a plurality of the first tasks according to the category to which the task object belongs to obtain a second task corresponding to the category to which the task object belongs;
for the second tasks corresponding to the same category:
extracting question keywords from the task object identification corresponding to the second task, and de-duplicating the question keywords according to the question keywords corresponding to a plurality of the second tasks respectively, and generating a question prompt according to the question keyword after deduplication.

15. The non-transitory computer-readable medium according to claim 13, wherein the generating of a question prompt according to the first feature information comprises:
ranking a plurality of the first tasks according to the generation time of the first task or the price corresponding to the first task, and determining, according to the ranked results, a preset number of third tasks with the latest generation time or the highest price from a plurality of the first orders, and generating a question prompt according to the third task.

16. The non-transitory computer-readable medium according to claim 10, wherein the determining of the first task according to the feature identification code corresponding to the input end of the task query request comprises:
determining the first task according to the feature identification code corresponding to the input end of the task query request and the query keyword contained in the task query request.

17. The non-transitory computer-readable medium according to claim 10, wherein,
when the first task is one, the first task is used as the target task.

* * * * *